United States Patent
Mazzoli

(10) Patent No.: US 10,151,421 B2
(45) Date of Patent: Dec. 11, 2018

(54) MULTI-FUNCTIONAL CARRIAGE

(71) Applicant: WM SYSTEM SRL, Rolo (IT)

(72) Inventor: William Mazzoli, Fabbrico (IT)

(73) Assignee: WM SYSTEM SRL, Rolo (RE) (IT)

( * ) Notice: Subject to any disclaimer, the term of this patent is extended or adjusted under 35 U.S.C. 154(b) by 31 days.

(21) Appl. No.: 15/216,912

(22) Filed: Jul. 22, 2016

(65) Prior Publication Data

US 2017/0023170 A1    Jan. 26, 2017

(30) Foreign Application Priority Data

Jul. 24, 2015 (IT) .................. 102015000037968

(51) Int. Cl.
*F16M 11/04* (2006.01)
*F16M 3/00* (2006.01)
*B25H 1/00* (2006.01)

(52) U.S. Cl.
CPC ............... *F16M 3/00* (2013.01); *B25H 1/00* (2013.01)

(58) Field of Classification Search
USPC ....... 248/639, 640, 642, 646, 651, 653, 654, 248/657, 671, 672, 678, 346.01, 346.02, 248/346.03
See application file for complete search history.

(56) References Cited

U.S. PATENT DOCUMENTS

| | | | | |
|---|---|---|---|---|
| 2,583,196 A | * | 1/1952 | Zander | B62B 3/104 280/47.35 |
| 2,726,066 A | * | 12/1955 | Lear | B23Q 1/28 188/69 |
| 3,158,347 A | * | 11/1964 | Sommer | F16M 7/00 248/651 |
| 3,866,867 A | * | 2/1975 | LaRocca | F16M 5/00 248/646 |
| 5,183,372 A | | 2/1993 | Dinverno | |
| 6,092,768 A | * | 7/2000 | Larson | B08B 3/026 248/129 |
| 6,120,234 A | | 9/2000 | Dinverno | |
| 8,186,285 B2 | * | 5/2012 | Fitts, Jr. | B65G 7/02 109/24.1 |
| 2005/0280228 A1 | | 12/2005 | Fernandes et al. | |
| 2008/0023618 A1 | * | 1/2008 | McGloghlon | B25H 1/0007 248/646 |
| 2014/0124646 A1 | * | 5/2014 | Cordiol | B65C 9/0062 248/646 |

FOREIGN PATENT DOCUMENTS

| | | |
|---|---|---|
| FR | 2821032 A1 | 8/2002 |
| GB | 2399794 A | 9/2004 |
| WO | 0030891 A1 | 6/2000 |

OTHER PUBLICATIONS

Extended European Search Report and Opinion dated Aug. 22, 2016, referring to EP application No. 16178565.4, corresponding to U.S. Appl. No. 15/216,912.

* cited by examiner

*Primary Examiner* — Terrell L McKinnon
*Assistant Examiner* — Michael McDuffie
(74) *Attorney, Agent, or Firm* — Volpe and Koenig, P.C.

(57) ABSTRACT

A multi-functional carriage includes: a support frame provided with wheels; an internal combustion engine able to actuate an air compressor and an electrical current generator. The internal combustion engine, the air compressor and the electrical current generator are installed on-board the support frame. The support frame includes a gripping apparatus able to engage and raise a harnessing frame for various devices.

7 Claims, 5 Drawing Sheets

MULTI-FUNCTIONAL CARRIAGE

TECHNICAL FIELD

The present invention relates to a multifunctional carriage.

In particular, the present invention relates to a multifunctional carriage able to be housed internally of a load compartment of a vehicle.

BACKGROUND

As is known, in the automotive sector there exist trucks equipped with all the tools necessary for carrying out repair interventions on motor vehicles or other vehicles outside the workshop; these are known as mobile workshops.

In particular, some of the mobile workshops are equipped so as to enable on-the-spot aid to motorists and lorry-drivers stranded after a breakdown due to punctures and/or mechanical faults.

In this sector, the prior art comprises self-propelling carriages, provided with wheels, on which some devices are installed that are necessary for aid operations and which can be housed internally of the mobile workshops.

With the presence of the wheels, the self-propelling carriage can be moved both internally and externally of the truck in order to reach the most favorable use position, as well as being loadable and unloadable from the truck compartment by use of a simple chute.

A known example of self-propelling carriage for a mobile workshop is structured so as to be able to provide assistance in a case of a tire puncture.

Usually installed on the carriage are: a tire changer for demounting or re-mounting a tire from/onto a rim, a compressor for inflating the tire and auxiliary equipment such as for example tools for demounting the tire from the wheel hub.

The tire-changer and the compressor are generally activated by means of electric motors. Consequently with the aim of guaranteeing operability even when it is not possible to connect up to the electricity grid, the self-propelling carriage is also provided with an internal combustion engine which activates a current generator able to power all the electrical devices that are installed on the carriage.

With respect to the traditional fixed installation of a tire changer and relative auxiliary apparatus internally of the truck, the above-described carriage has the advantage of enabling interventions in places where for reasons of traffic or space it is not possible to park the mobile workshop in proximity of the vehicle which is to be serviced. To this can be added the advantage that particularly large tires such as those fitted on articulated trucks are moved much more easily outside the mobile workshop, and the self-propelling carriages enable this to be done.

Although these carriages enable greater versatility and facility of use with respect to the traditional fixed installation, they are anti-economic in cases in which the mobile workshop needs to transport different devices.

For example, a mobile workshop that intervenes in cases of both motor vehicles and articulated trucks requires a tire-changer for motor vehicles and a tire-changer for articulated lorry tires, which for questions of size cannot be positioned on a same carriage.

Consequently two carriages are necessary, each having an internal combustion engine, compressor and so on.

The same is true in cases where other large and/or heavy devices for repairing vehicles are to be transported.

An aim of the present invention is to provide carriage able to obviate the above-mentioned drawbacks in the prior art, with a solution that is simple, rational and relatively inexpensive.

The aims are attained by the characteristics of the invention as reported in the independent claim. The dependent claims delineate preferred and/or particularly advantageous aspects of the invention.

SUMMARY

As a solution to the above-cited drawbacks, the invention discloses a multi-functional carriage comprising: a support frame provided with wheels; an internal combustion engine able to actuate an air compressor and an electrical current generator, wherein the internal combustion engine, the air compressor and the electrical current generator are installed on-board the support frame; where the support frame comprises a gripping apparatus able to engage and raise a harnessing frame for various devices.

With this solution it is possible to move various devices with a single carriage. It is further possible to provide modules containing a plurality of devices, associated to a single harnessing frame and therefore contemporaneously transportable.

In a further aspect of the invention, the harnessing frame comprises a perimeter border fixable to the devices.

In this way the harnessing frame can be solidly associated to the devices.

In a further aspect of the invention, the harnessing frame comprises a plurality of gripping pins able to be hooked to the gripping apparatus.

In this way the hooking and lifting of the harnessing frame is facilitated.

In a further aspect of the invention, the gripping apparatus comprises a plurality of lift forks, each of which is able to engage a respective gripping pin and to lift the harnessing frame.

With this solution a simple and compact system is obtained, actuatable in a very rational way, which enables hooking and lifting the gripping pins of the harnessing frame.

In a further aspect of the invention, each lift fork is associated to the support frame by means of a hinge joint.

In this way the forks are prevented from having other movements apart from rotation with respect to the hinge joint.

In a further aspect of the invention, each lift fork is rotated about an axis of the hinge joint by means of an actuating mechanism, between a gripped position, able to facilitate insertion of the pin in the lift fork, and a raised position, able to maintain the harnessing frame raised from the rest surface of the wheels.

In this way it is possible to hook, lift and release the harnessing frame with an annexed device, maintaining the multi-functional carriage on the rest surface.

In a further aspect of the invention, at least a wheel is motorized.

With this solution the multi-functional carriage can be moved without exertion.

In a further aspect of the invention, the multi-functional carriage comprises a steering guide able to guide the multi-functional carriage.

In this way the multi-functional carriage is provided with a device that is easy to use for directing the control of the advancement velocity.

In a further aspect of the invention, the multi-functional carriage comprises a clutch able to disengage the internal combustion engine so as to enable supply to the multifunctional carriage via an electricity grid.

In this way, where a connection to the electricity grid is available, the internal combustion engine is left off, thus avoiding the production of exhaust gases, which is an important aspect in a case where a room is not ventilated.

BRIEF DESCRIPTION OF THE DRAWINGS

Further characteristics and advantages of the invention will emerge from a reading of the following description, provided by way of non-limiting example with the aid of the figures illustrated in the appended tables of drawings.

DETAILED DESCRIPTION OF THE PREFERRED EMBODIMENTS

Figure 1:
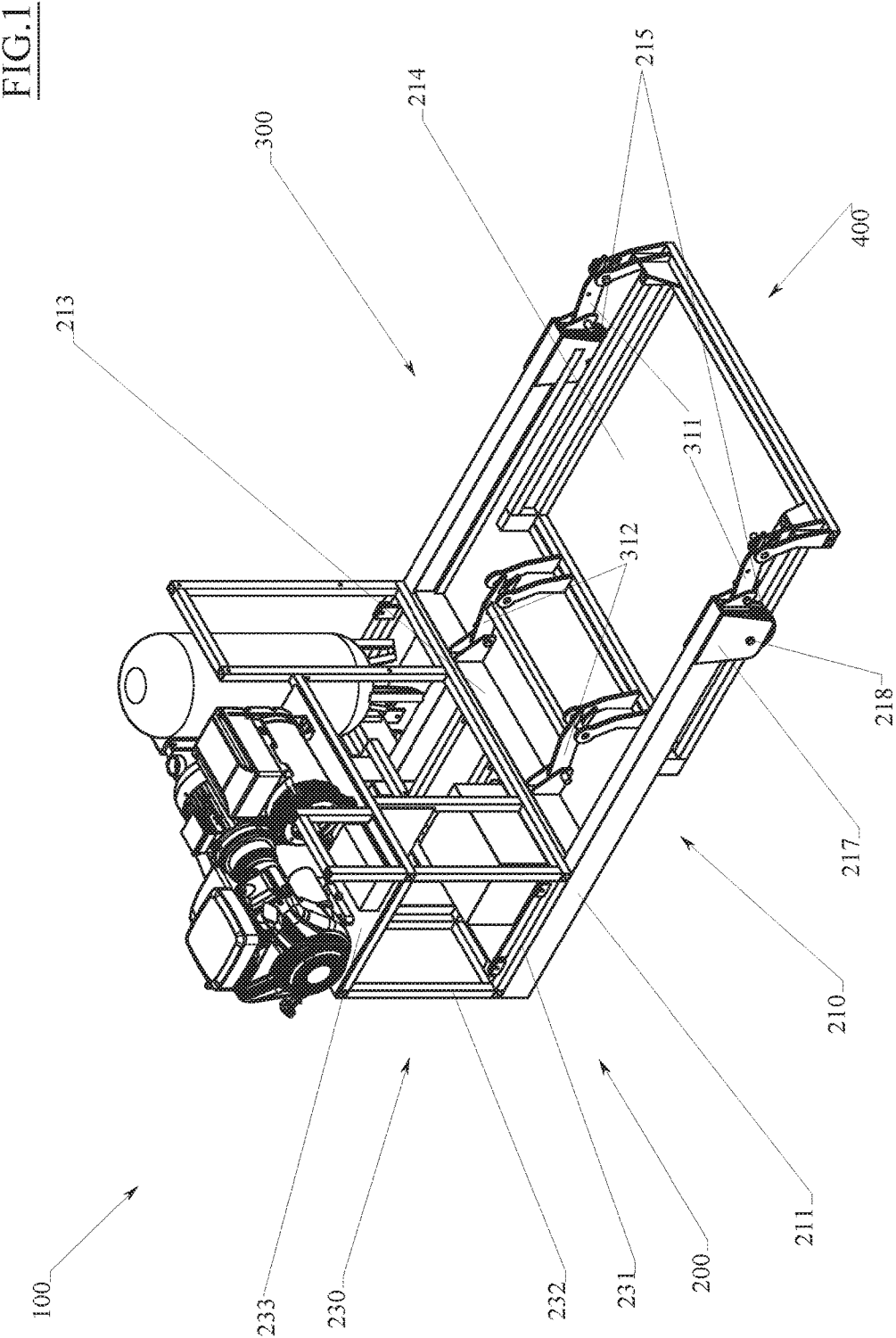
FIG. 1 is a front orthographic view of the multi-functional carriage.

With particular reference to these figures, 100 denotes in its entirety a multi-functional carriage able to be housed internally of a load compartment of a vehicle.

The multi-functional carriage 100 comprises a support frame 200 to which is associated a gripping apparatus 300 able to engage and raise a harnessing frame 400, which in turn can be associated to any device to be transported.

The support frame 200 comprises a vertical structure 230 and a horizontal base 210 that can be rested on a ground surface by means of a plurality of wheels.

It is specified that in the present description the terms "horizontal" and "vertical" are used with reference to the condition in which the base is resting on a horizontal surface.

The horizontal base 210 comprises a pair of straight longitudinal members 211, parallel to one another and joined by means of a first cross-member 212 and a second cross-member 213 perpendicular to the longitudinal members 211.

The second cross-member 213 is straight and coplanar to the longitudinal members 211, while the first cross-member 212 comprises two L-shaped end elements having the connection portion to the longitudinal members 211 orientated horizontally and the other portion facing vertically upwards, i.e. in an opposite direction to the rest surface. The two end elements are joined by means of a straight intermediate bar.

The first cross-member 212 is positioned at an end of the longitudinal members 211, which will define the rear end, while the second cross-member 213 is positioned between the first cross-member 212 and half of the length of the longitudinal members 211.

The first longitudinal member, the second longitudinal member and the second cross-member 213 define a load compartment 214 having a rectangular plan, in which the various devices are housed.

In particular the load compartment 214 is laterally delimited by the longitudinal members 211 and posteriorly by the second cross-member 213 and by the vertical frame, while it remains frontally and superiorly open.

The components of the horizontal base 210 described up to the present point can consist in straight beams having a hollow rectangular section with the exception of the first cross-member 212 which has a C section.

Figure 2:
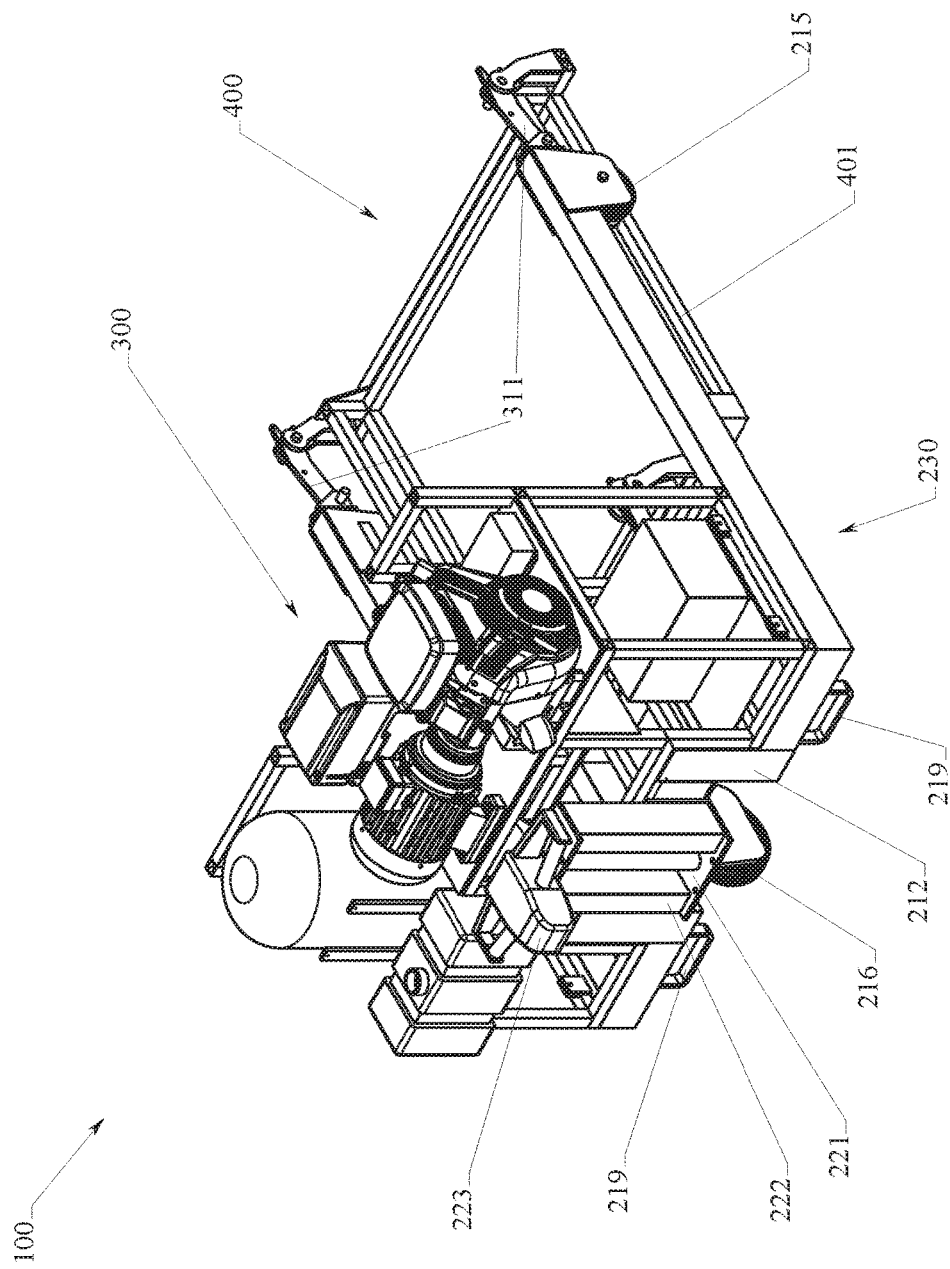
FIG. 2 is a rear orthographic view of the multi-functional carriage.

Previously reference has been made to the fact that the base comprises wheels for resting on the ground. In this regard, the wheels of the horizontal base 210 can be three in number: two front 215 and one rear 216 (see FIG. 2).

The front wheels 215 can be positioned, one per longitudinal member, at the front end of the longitudinal members 211, i.e. opposite the end where the first cross-member 212 is present.

The front wheels 215 belong, for example, to the category of the idle wheels and are associated to the longitudinal members 211, by means of wheel brackets 217, comprising flat plates provided with a hole able to house a wheel pin 218.

The rear wheel 216 can be associated to a shelf 221 fixed projectingly to the first cross-member 212. In particular the rear wheel 216 can be motorized and able to rotate by 360° so as to facilitate the displacement of the multi-functional carriage 100.

Two vertical uprights 221 extend from the upper plane of the shelf, which function as a support for a steering guide 223, provided with handles, able to comprise the commands for the guiding of the multi-functional carriage 100.

The horizontal base 210 further comprises a pair of slots 219, formed for example by C-shaped bars inferiorly fixed to the first longitudinal member, able to guide the forks of a fork-lift truck should it be necessary to displace the multi-functional carriage 100 using the truck.

Figure 3:
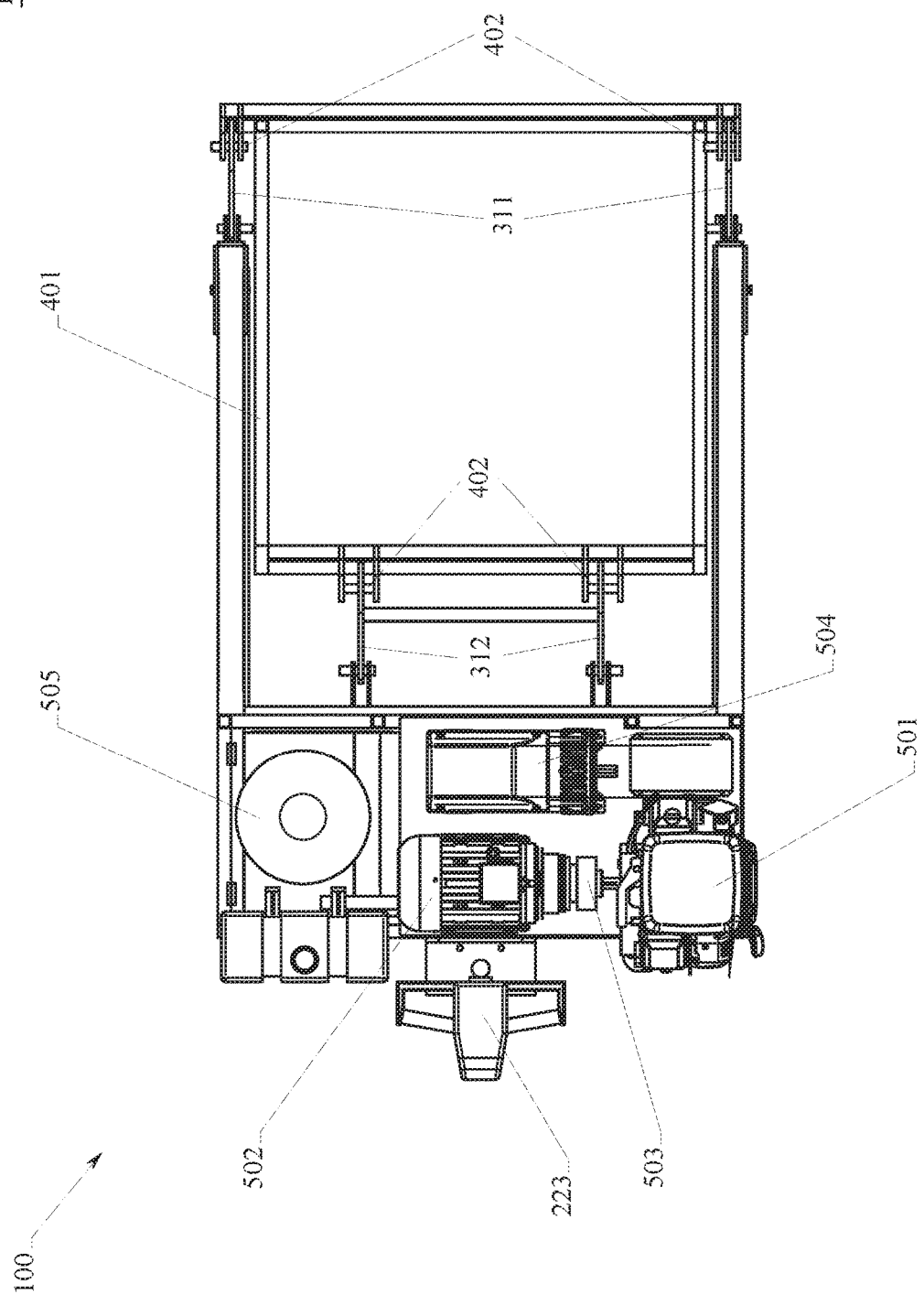
FIG. 3 is a view from above of the multi-functional carriage.
Figure 4:
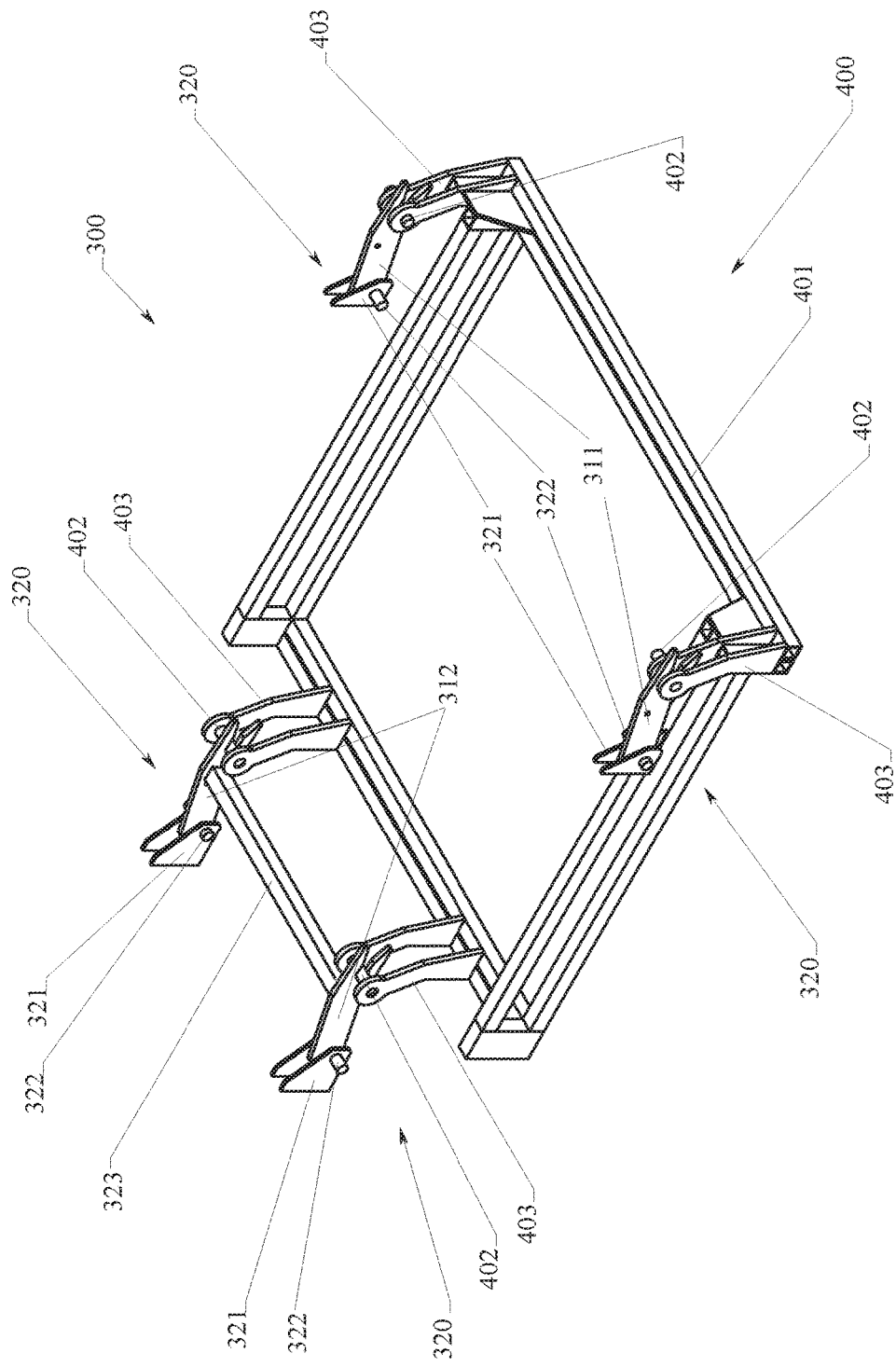
FIG. 4 is an orthographic view of the harnessing frame hooked to the grip-ping apparatus.

The vertical structure 230 is associated to the horizontal base 210, to which vertical structure 230 are associated, for example: an internal combustion engine 501, an electricity generator 502 provided with a clutch 503 able to disconnect the electricity generator from the internal combustion engine 501, and an air compressor 504 provided with a compressed-air tank 505 (see FIG. 3).

This vertical structure 230 is positioned at the horizontal base zone 210, comprised between the first cross-member 212 and the second cross-member 213; it comprises a base chassis 231, rested on the cross-members 212 and 213, and on the longitudinal members 211, from which vertical columns 232 extend, positioned in the corners of the base chassis 231, which support a rest plane 233 able to function as a support for the internal combustion engine 501, the current generator 502 and the air compressor 504.

The multi-functional carriage 100 further comprises the gripping apparatus 300, which is provided for example with two front lift forks 311 and two rear lift forks 312, able to hook the harnessing frame 400.

The front lift forks 311 can be positioned at the front ends of the longitudinal members 211, while the rear fork 312 can be positioned at the second cross-member 213.

Figure 5:
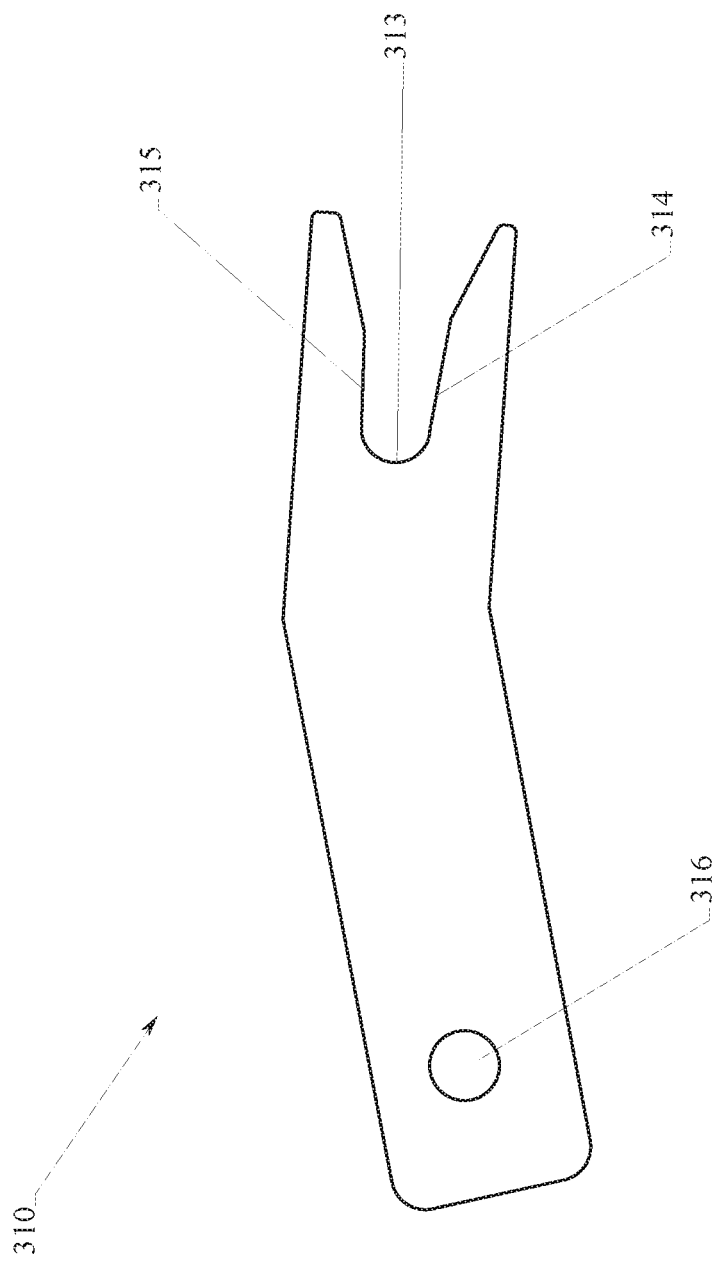
FIG. 5 is a lateral view of the lift fork.

The lift forks 311, 312 comprise for example a flat plate, having an indicatively elongate rectangular plane, having, on an end thereof a V-shaped recess, which determines a concavity 313 provided with a lower arm 314 and an upper arm 315 able to hook the harnessing frame 400 (see FIG. 5).

A hole 316 is present on the other end, enabling inserting a pin 322 which enables rotation of the lift fork 311, 312 with respect to the support thereof according to a horizontal rotation axis.

The lift forks can be hinged to the respective supports by means of hinge joints 320, comprising for example brackets 321 provided with holes for housing the pin and orientated in such a way that the lift forks 311, 312 can rotate about the axis of the hinge 320 lying on a vertical plane, which is perpendicular to the rest surface and parallel to the longitudinal members 211.

Further, the rear lift forks 312 can be connected to one another by means of a connecting rod 323 which can cause the rear lift forks 312 to move contemporaneously and which means only one activating means is required for both.

The gripping apparatus 300 further comprises an actuating mechanism 330, associated to an end of the vertical structure 230 and, at the other ends, to the connecting rod 323, able to command the rotation of the rear lift forks 312.

The actuating mechanism 330 can for example comprise a manual winch provided with a pulley on which a cable winds and is associated at an end thereof to the connecting rod 323. The pulley can be provided with a crank for commanding rotation thereof, and therefore the winding and unwinding of the cable.

The harnessing frame 400 comprises a perimeter border 401, constituted for example by straight tubes having a hollow rectangular section, able to surround the base of whichever device and to be fixed thereto.

The perimeter border 401 can be provided with fourth gripping pins 402, one for each lift fork 311, 312, able to be hooked by the gripping apparatus 300, which can be connected to the perimeter border 401 by means of brackets 403, able to cause the gripping pins 402 with respect to the perimeter border.

The functioning of the multi-functional carriage 100 as described above is as follows.

Firstly, the device that is to be transported by means of the multi-functional carriage 100 must be provided with a harnessing frame 400, which can be associated to the device by welding or can be bolted.

Once the device is ready for transporting, the multi-functional carriage 100 is moved in such a way as to insert the harnessing frame 400 together with the device fixed thereto, internally of the load compartment 214.

During this operation the lift forks 311, 312 are in a gripped position, in which the concavity 313 of the fork is horizontally facing and on the same height level as the gripping pin 402.

When all the gripping pins 402 are coupled to the lift forks 311, 312, the lifting of the device can be proceeded to.

The actuating mechanism 330 is actuated in such a way that the rear lift forks 311 rotate about the pin axis 322, describing an arc of about 90°, passing from the gripped position to the raised position, in which the concavity 313 of the lift fork 311, 312 is orientated vertically upwards.

During the lifting, the lower arms 314 of the rear forks 311 push on the rear gripping pins 402, and raise them vertically while at the same time horizontally translating them towards the rear part of the multi-functional carriage 100.

During this step, the front forks 312 perform the same rotation as they are kinematically connected to the rear forks 311 by means of the perimeter border 401 of the harnessing frame 400.

The gripping pins 402 push on the upper arms 315 of the rear lift forks 311, causing rotation thereof about the pin axis 322.

When the lift forks 311, 312 are in a raised position, the gripping pins 402 are pressed to the bottom of the concavities 313 by the weight of whichever device to which they are associated and the carriage can be moved.

When it is necessary to deposit the device present in the load compartment 214 on a ground surface, the actuating mechanism 330 is actuated in such a way that the rear lift forks 311 rotate about the pin axis 322, describing an arc of about 90°, passing from the raised position to the gripped position.

In this way interchangeable modules can be included, each provided with its own harnessing frame 400, containing various devices that can be displaced by means of a single multi-functional carriage 100 already provided with the basic apparatus such as the electricity generator 502 and the air compressor 504.

For example, it is possible to equip a module for replacement of motor vehicle tires, comprising a tire changer and a balancer, or a module for replacing articulated lorry tires, comprising a tire changer and a balancer that are dimensioned for large-dimension tires, or a module for washing cars, comprising a water cleaner, a vacuum cleaner, a steam machine and tanks, or a module for performing services, comprising tools, replacement parts and tanks.

The invention as it is conceived is susceptible to numerous modifications, all falling within the scope of the inventive concept and although a use thereof has been described in mobile workshops, it ca also be used in traditional workshops.

Further, all the details can be replaced with other technically-equivalent elements.

In practice the materials used, as well as the contingent shapes and dimensions, can be any according to requirements, without forsaking the scope of protection of the following claims.

The invention claimed is:

1. A multi-functional carriage (100) comprising:
a support frame (200) provided with wheels;
an internal combustion engine (501) able to actuate an air compressor (504) and an electrical current generator (502), wherein the internal combustion engine (501), the air compressor (504) and the electrical current generator (502) are installed on-board the support frame (200);
wherein the support frame (200) comprises a gripping apparatus (300) able to engage and raise a harnessing frame (400) for various devices,
wherein the harnessing frame (400) comprises a plurality of harnessing pins (402) able to be hooked to the gripping apparatus (300), and wherein the gripping apparatus (300) comprises a plurality of lift forks (311, 312), each of which is able to engage a respective harnessing pin (402) and to lift the harnessing frame (400).

2. The carriage of claim 1, wherein the harnessing frame (400) comprises a perimeter border (401) fixable to the devices.

3. The carriage of claim 1, wherein each lift fork (311, 312) is associated to the support frame (200) by means of a hinge joint (320).

4. The carriage of claim 3, wherein each lift fork (311) (312) is rotated about an axis of the hinge joint (320) by means of an actuating mechanism (330), between a gripped position, able to facilitate insertion of the pin in the lift fork (311, 312), and a raised position, able to maintain the harnessing frame (400) raised from the rest surface of the wheels.

5. The carriage of claim 1, wherein at least a wheel is motorised.

6. The carriage of claim 1, further comprising a steering guide (223) able to guide the multi-functional carriage (100).

7. The carriage of claim 1, further comprising a clutch (503) able to disengage the internal combustion engine (501) so as to enable supply to the multi-functional carriage (100) via an electricity grid.

\* \* \* \* \*